Figure 3:
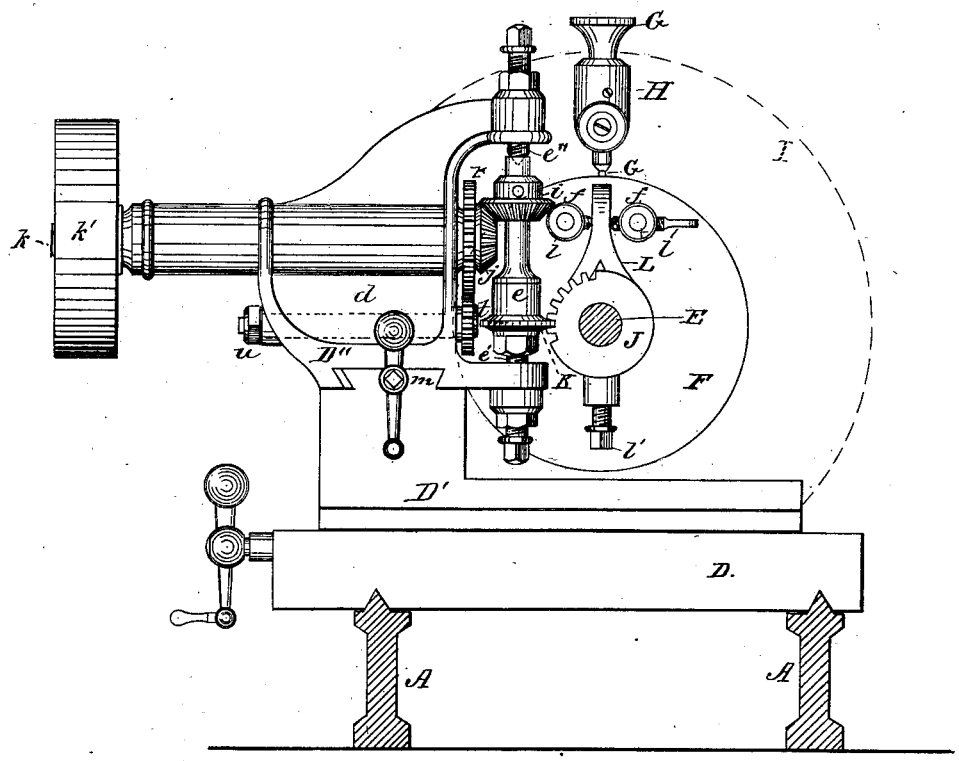

(No Model.)  
2 Sheets—Sheet 1.
H. C. BARNES.
Lathe Attachment.
No. 241,907.  Patented May 24, 1881.
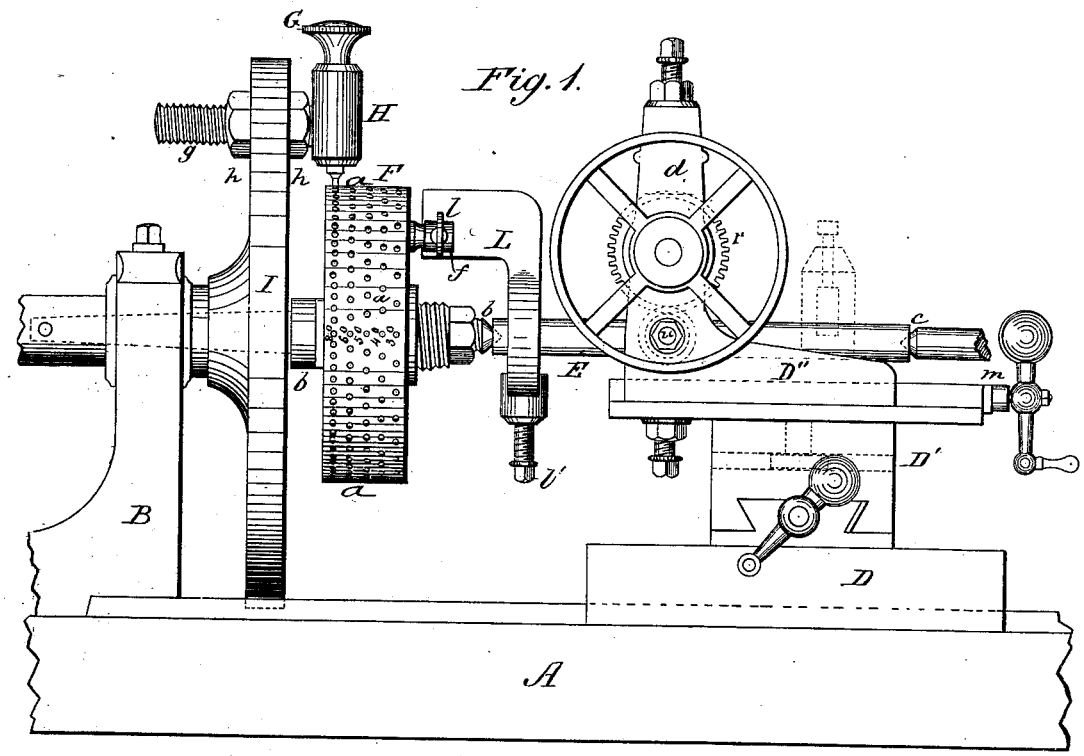
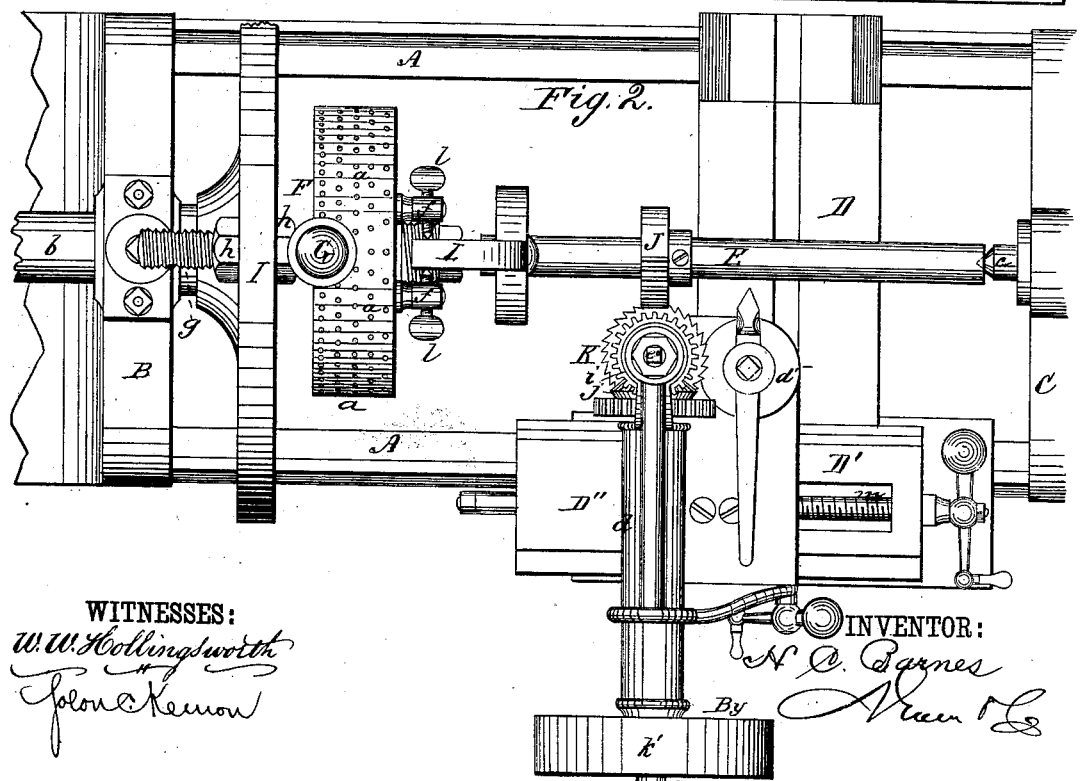
WITNESSES:
W. W. Hollingsworth
John C. Kenon
INVENTOR:
H. C. Barnes
By
ATTORNEYS.

(No Model.) 2 Sheets—Sheet 2.

H. C. BARNES.
Lathe Attachment.

No. 241,907. Patented May 24, 1881.

WITNESSES:
W. W. Hollingsworth
Solon C. Kemon

INVENTOR:
H. C. Barnes
BY
ATTORNEYS.

UNITED STATES PATENT OFFICE.

HARRY C. BARNES, OF VALLEJO, CALIFORNIA.

LATHE ATTACHMENT.

SPECIFICATION forming part of Letters Patent No. 241,907, dated May 24, 1881.

Application filed June 24, 1880. (No model.)

*To all whom it may concern:*

Be it known that I, HARRY C. BARNES, a citizen of the United States, residing at Vallejo, in the county of Solano and State of California, have invented a new and Improved Lathe Attachment for Cutting Teeth in Gear-Wheels, of which the following is a full, clear, and exact description, reference being had to the drawings hereto annexed.

The object of the invention is to combine with a lathe an attachment by which teeth may be cut in gear-wheels with accuracy and rapidity.

In the drawings, Figure 1 is a front elevation of my invention applied to a lathe; Fig. 2, a plan view of the same, and Fig. 3 a transverse section. Fig. 4 is a side view of a drill-spindle and drill.

A represents the shears or ways of an ordinary turning-lathe; B, the head-stock; C, the tail-stock, and $b$ $c$ the live and dead spindles, respectively.

D is the usual carriage, to the transversely-movable portion of which is attached a slide-rest, D', the upper portion, D'', of which is adapted to be moved backward and forward, by means of screw $m$, in a direction parallel to the shears, and said upper portion terminates at top in a standard, $d$, and carries a turning tool-post, $d'$.

K is a rotary cutter mounted on a spindle, $e$, which is supported in an upright position by set-screws $e'$ $e''$.

Attached to the spindle is a bevel-pinion, $i$, which gears into a corresponding pinion, $j$, on the end of a shaft, $k$, which is journaled in the standard $d$, and carries at its outer end a pulley, $k'$. This pulley is belted to another pulley on the usual counter-shaft above the lathe, and it communicates the motion of the counter-shaft, through the medium of the shaft and bevel-gears, to the rotary cutter.

To the live spindle of the lathe is screwed a face-plate, I, to which is adjustably attached, by means of the screw-stem $g$ and jam-nuts $h$ $h$, the stop-pin holder H, in which the stop-pin G is free to slide up and down within certain limits.

F is a graduated dividing-wheel loosely journaled on the lathe-center $b$, and provided with lugs $f$ $f$ and set-screws $l$ $l$, which, in connection with the dog L, serve to clamp the mandrel that holds the wheel to be toothed to the graduated dividing-wheel. The point of the stop-pin G works in the holes $a$, and its holder is adjustable across the face of the graduated driving-wheel, so that said point may be entered into any hole in either of the series.

J represents a blank wheel, to be toothed, secured on mandrel E, which is supported upon the centers of the live and dead spindles of the lathe and connected to the graduated dividing-wheel by means of the dog and clamp-screws, as before stated.

In order to set the machine for use, the stop-pin holder is adjusted across the face of the graduated dividing-wheel until the stop-pin stands over the row of holes, which will divide into as many aliquot parts as there are teeth to be cut in the wheel, and then let down into one of said holes. The mandrel, with the wheel to be toothed secured upon it, is then placed in position upon the lathe-centers and connected by the dog and clamp-screws to the graduated dividing-wheel. The rotary cutter, while in motion, is then brought up to the wheel by means of the carriage and slide-rest screws, and the latter made use of to feed the cutter, while the former is used to give the depth of cut, and after every excision made in the wheel by the rotary cutter the stop-pin is withdrawn from the hole in the graduated dividing-wheel and the latter turned the required distance to space a tooth on the wheel, when the pin is let down, and again holds the wheel firmly while another tooth is being cut, and this operation is repeated and continued until the wheel is toothed.

Besides the gear-cutting device, the slide-rest is provided with means for drilling small holes and also for turning and truing work placed upon the centers of the lathe.

Figure 4:
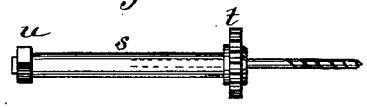

Figs. 1 and 2 show, in dotted and full lines respectively, a turning tool-post and tool of usual construction attached to the slide-rest to be operated in the usual way; and Fig. 3 shows means for drilling small holes, which consists simply of a spindle, $s$, (shown in dotted lines in Fig. 3 and full lines in Fig. 4,) journaled in the standard $d$, below and parallel to the shaft $k$, and provided at its forward end with a gear, $t$, and at its rear end with a nut, $u$. The gear $t$ meshes with gear r on shaft k, and through the medium of this gearing the drill-spindle receives its motion from the shaft k; and to adapt the device for drilling it is only necessary to remove the gear-cutter spindle and introduce the drill into its spindle.

Having thus described my invention, what I claim, and desire to secure by Letters Patent, is—

1. The combination, with the face-plate I, which is fixed in position, the stop-pin G and holder H therefor, and the screw and nuts for securing the stop-pin to said face-plate in different adjustments in a horizontal plane, of the dividing-wheel, mounted loose on a fixed arbor and having its broad periphery perforated, as described, and provided with lugs f and clamp-screws l, the dog L, and mandrel for carrying the gear-blank, all as shown and described, to operate in the manner specified.

2. The combination, with the rest D', adapted to slide transversely of a lathe, of the part D'' d attached thereto so as to slide parallel to the ways of the lathe, the screw m for adjusting said part D'', the horizontal spindle k, having its bearing in the latter and carrying at one end the bevel-pinion i and at the other the pulley k', and the vertical spindle e, carrying gear-cutter K and gearing with spindle k, all operating as specified.

HARRY CLINTON BARNES.

Witnesses:
DOUGLAS G. BARNES,
JAMES M. BUSWELL.